United States Patent [19]
Muraoka

[11] Patent Number: 5,772,738
[45] Date of Patent: Jun. 30, 1998

[54] MULTIFUNCTIONAL AIR FILTER AND AIR-CIRCULATING CLEAN UNIT WITH THE SAME INCORPORATED THEREIN

[75] Inventor: Hisashi Muraoka, Yokohama, Japan

[73] Assignees: Purex Co., Ltd.; Kabushiki Kaisha Toshiba, both of Kanagawa-ken, Japan

[21] Appl. No.: 657,935

[22] Filed: May 30, 1996

Related U.S. Application Data

[63] Continuation-in-part of Ser. No. 351,089, Nov. 30, 1994, abandoned.

[30] Foreign Application Priority Data

Nov. 30, 1993 [JP] Japan .................................. 5-326062

[51] Int. Cl.⁶ .................................................. B01D 53/02
[52] U.S. Cl. ........................... 96/129; 55/385.2; 55/486; 96/132; 96/135; 96/138; 96/151; 96/154
[58] Field of Search ................................. 55/385.2, 486; 96/129, 130, 131, 132, 135, 138, 140, 142, 151, 153, 154

[56] References Cited

U.S. PATENT DOCUMENTS

| | | | |
|---|---|---|---|
| 3,144,315 | 8/1964 | Hunn | 55/486 |
| 4,181,513 | 1/1980 | Fukuda et al. | 55/486 |
| 4,259,096 | 3/1981 | Nakamura et al. | 55/486 |
| 4,323,374 | 4/1982 | Shinagawa et al. | 55/486 |
| 4,548,627 | 10/1985 | Landy | 55/385.2 |
| 4,877,433 | 10/1989 | Oshitari | 55/486 |
| 4,878,929 | 11/1989 | Tofsland et al. | 55/486 |
| 4,927,438 | 5/1990 | Mears et al. | 55/385.2 |
| 5,124,856 | 6/1992 | Brown et al. | 96/135 |
| 5,133,788 | 7/1992 | Backus | 55/486 |
| 5,302,354 | 4/1994 | Watvedt et al. | 55/486 |

FOREIGN PATENT DOCUMENTS

| | | | |
|---|---|---|---|
| 2 232 094 | 12/1990 | United Kingdom | 96/135 |
| 2 234 919 | 2/1991 | United Kingdom | 96/135 |

*Primary Examiner*—C. Scott Bushey
*Attorney, Agent, or Firm*—Wenderoth, Lind & Ponack

[57] ABSTRACT

A multifunctional air filter module includes a filter case having an air introduction side opening and an air discharge side opening and a pleated fabric air filter element containing an activated carbon. The periphery of the pleated filter element is fixed in the filter case without clearance therebetween. At least one fabric filter element composed of a fabric including an activated carbon having a strong base, $KMnO_4$ or $ZnCl_2$, a fabric of a cation exchange fiber or a fabric of an anion exchange fiber, is simply placed in air introduction side grooves formed by pleats of the fixed air filter element, and is replaceable and can be regenerated. The air filter module is compact and can reduce the volume of a space occupied thereby in a semiconductor plant. Flexibility of installation thus is provided and the range of the use thereof is widened. Multifunctionality is increased easily merely by addition of replaceable filter element fabrics.

11 Claims, 5 Drawing Sheets

FIG.6

MULTIFUNCTIONAL AIR FILTER AND AIR-CIRCULATING CLEAN UNIT WITH THE SAME INCORPORATED THEREIN

BACKGROUND OF THE INVENTION

This is a continuation-in-part of application Ser. No. 08/351,089 filed Nov. 30, 1994, now abandoned.

1. Field of the Invention

The present invention relates to a multifunctional air filter module capable of removing chemical contaminants from the air to a very low level of concentration required, for example, for processing apparatuses for the semiconductor industry, and an air-circulating clean unit with such filter module incorporated therein.

2. Description of the Prior Art

Conventionally, an air filter module for removing chemical contaminants from the air, namely, organic substances, acid gases, such as HF and HCl, alkaline gases, such as $NH_3$ and amines, $NO_x$, $SO_x$, and the like is generally called a chemical filter and, as an absorber constituting the chemical filter element, for example, activated carbon, activated carbon having an adsorptive substance attached thereto, and an ion exchange resin are used. In such a filter module, it is desirable that the pressure loss is low at a prescribed flow rate at which a certain level of capacity of removing contaminants is exhibited and that the filter is light in weight. Therefore, such a filter module has the same structure as that of a HEPA (high efficiency particulate air) filter for removing fine particles. That is, where the filter element is used in the form of a flat sheet and the sheet is placed across the air flow, the filtration area is small and the air residence time in the element is short. Therefore the sheet is folded into pleats to increase the filtration area to decrease the flow rate per unit area of the element, so that the air residence time is lengthened.

A clean bench used, for example, in processing apparatuses for the semiconductor industry, is generally equipped only with a HEPA filter, and in the case wherein it is also required to remove chemical contaminants satisfactorily, the above pleat type chemical filter is installed in layers on the windward side or inlet side of the HEPA filter.

A commercially available typical pleat type chemical filter module is one called DPCC (dry processed carbon composite) manufactured by EXTRACTION SYSTEMS INC. and made up of pleats of a sheet made of polyester fibers having a thickness of about 6 mm and containing activated carbon fine particles or activated carbon fine particles having an adsorptive substance attached thereto. Since the sheet itself has a suitable rigidity, a support for supporting the pleats is not required. Further, pleat type modules are known that are constructed by woven fabric elements of 1–4 mm in thickness made of woven fabric of ion exchange resin fibers or activated carbon fibers.

If the processing apparatus requires a clean environment where only one particular chemical contaminant is to be removed, the system made up of one such chemical filter and one HEPA filter arranged in series is acceptable. However, if the processing apparatus requires an environment where all chemical contaminants in the air, such as organic substances, acid gases, alkaline gases, $NO_x$, and $SO_x$, are to be removed to a satisfactory low level of contamination (hereinafter referred to as an "ultraclean environments"), it is impossible to attain that environment by only one type of chemical filter. For example, as a pleat type filter module capable of removing $NO_x$ and $SO_x$, at present, only DPCC that contains activated carbon fine particles having an adsorptive substance attached thereto is a commercially available filter, but although it can remove acid gases, it is weak in capacity of removing alkaline gases and certain organic substances. Therefore it is required that two or more chemical filter modules are arranged successively, that is, this type of filter module is combined with other type of filter module that can remove the alkaline gases or organic substances.

However, pleat type filter modules are essentially thick and since usual commercially available pleat type filters have a thickness of 15 to 30 cm, in a place where the height of the ceiling is limited, such as a clean room for semiconductors, the height of a clean bench having three or more filter modules including HEPA arranged in series becomes too high and therefore the clean bench is not practical. If three filter modules are installed, since the life of the chemical filter is fairly shorter than that of the HEPA filter, only that chemical filter module is required to be replaced first and such replacement is troublesome. Further, the conventional pleat type chemical filter module has the problem that after being used many pleat type chemical filter modules are not easy to be dealt with as industrial waste.

SUMMARY OF THE INVENTION

Therefore, an object of the present invention is to provide a pleat type chemical filter module which can remove various chemical contaminants by using only one such module to secure an ultraclean environment and in which filter elements thereof can be readily replaced and regenerated for reuse.

Another object of the present invention is to provide an air-circulating clean unit that uses the above filter module.

According to the present invention, there is provided a multifunctional air filter module with a replaceable and reusable fabric filter element(s) for reducing both organic and inorganic contaminants, comprising:

a filter case having an air introduction side opening and an air discharge side opening;

a pleated fabric filter element essentially consisting of an activated carbon fiber having no further chemical contaminant absorptive substance attached thereto, a combination of said activated carbon and a reinforcing fiber, or a combination of a fabric and an activated carbon particles contained therein, positioned in said filter case in such a way that the pleated air filter element extends across an air flow directed from said air introduction side opening to said air discharge side opening, said pleated air filter element having a periphery that is fixed to said case without a clearance therebetween; and at least one replaceable fabric filter element formed of a fabric selected from the group consisting of a fabric containing an activated carbon having a strong base attached thereto, a fabric containing an activated carbon having $KMnO_4$, attached thereto, a fabric containing an activated carbon having $ZnCl_2$ attached thereto, a cation exchange fiber fabric, and an anion exchange fiber fabric, said replaceable fabric filter element being simply placed in air introduction side grooves formed by said pleated fabric filter element and having a periphery not attached to the case.

The pleated fabric filter element fixed to the case is sometimes hereinafter referred to "fixed filter element", and the fabric filter element simply placed on the fixed filter element and not fixed to the case is sometimes hereinafter referred to as "replaceable filter element".

According to the present invention, there is also provided an air-circulating clean unit including a box isolating the inside thereof from the outer environment, a chamber formed in said box in which a clean air space is formed for, e.g. accommodating a processing apparatus, and having an air inlet and an air outlet, an air passage for recirculating the air discharged from said air outlet into said air inlet, at least one air filter module for removing at least one kind of chemical contaminants as defined above arranged in the course of the air passage, and a filter module for removing fine particles such as dust particles arranged immediately upstream of the air inlet of said chamber.

Since the multifunctional air filter module of the present invention can reduce considerably the volume of space occupied by chemical filter modules in a semiconductor plant, flexibility of installation is achieved and the range of application of the chemical filter modules is widened. Further, multifunctionality is increased easily, for example, only by adding a felt-like filter element fabric. Therefore, replacement is easy when the multifunctional air filter has become deteriorated, needs several minutes only, and is not dusty. In most cases, the deteriorated one can be recycled economically.

In comparison with a case where a plurality of chemical filter modules are used, this multifunctional air filter module is poor in cleaning capacity if the air is used after only one passage of the air therethrough, but in the case where the multifunctional air filter module is incorporated into an air-circulating clean unit, the air is repeatedly passed through the module, so that an ultraclean environment can be created easily. In addition, the unit can be made compact and if used as a clean bench type unit, then since the unit does not have a large height dimension, the unit can be installed in a clean room without difficulty.

Further, since, in the multifunctional air filter module of the present invention, the replaceable filter element is simply placed in the grooves of the pleated fixed filter element that serves as a foundation, if the chemical absorptive function is lowered or lost, it easily can be replaced with a new or fresh replaceable filter element fabric. The thus removed replaceable filter element fabric, if the absorption of harmful chemical substances is due to an attached chemical contaminant absorptive agent, can be easily regenerated by dipping the filter element in warm water or the like to remove reaction products and by then attaching a fresh measure of the agent. If the absorption of harmful chemical substances is due to ion exchange resin fibers, the absorption function can be regenerated by the well known technique of regenerating ion exchange resins. The replaceable filter elements thus regenerated are reusable for the module of the invention.

Further, if the chemical substance absorptive filter element fabric can no longer be regenerated, can be disposed of easily by burning and therefore presents no problem of generation of industrial waste.

DETAILED DESCRIPTION OF PREFERRED EMBODIMENTS

The present invention will now be described in detail with reference to the embodiments shown in the accompanying drawings.

The multifunctional air filter module

The activated carbon contained in the fixed pleated filter element has no chemical contaminant absorptive agent, and in this point it is different from the activated carbon which may be contained in the replaceable filter element(s). The fixed filter element of such materials are effective in removing organic substances, alkaline gases such as $NH_3$, and amines, ozone, etc.

Materials for the fixed filter element include, for example, the following.

(1) Woven or unwoven fabrics of an activated carbon fiber having no further chemical contaminant absorptive substance attached thereto. A fabric of this type may be sandwiched on both sides thereof with a reinforcing woven or unwoven fabric. Such fabrics having a content of fibrous activated carbon of 80% to 100% are commercially available. Fibrous activated carbon is available under the tradename of ADOL from OSAKA GAS KK, Japan.

(2) Woven or unwoven fabrics formed of an activated carbon fiber having no further chemical contaminant absorptive substance attached thereto and a reinforcing fiber Such fabrics having a content of fibrous activated carbon of 70% to 80% are commercially available.

(3) Woven or unwoven fabrics containing an activated carbon particles having no further chemical contaminant absorptive substance attached thereto. For example, a filter module is available under tradename DPCC 1076 from EXTRACTION SYSTEMS INC., in which a pleated polyester fiber sheet containing activated carbon fine particles is fixed in a filter case as defined in the present invention.

Figure 1:
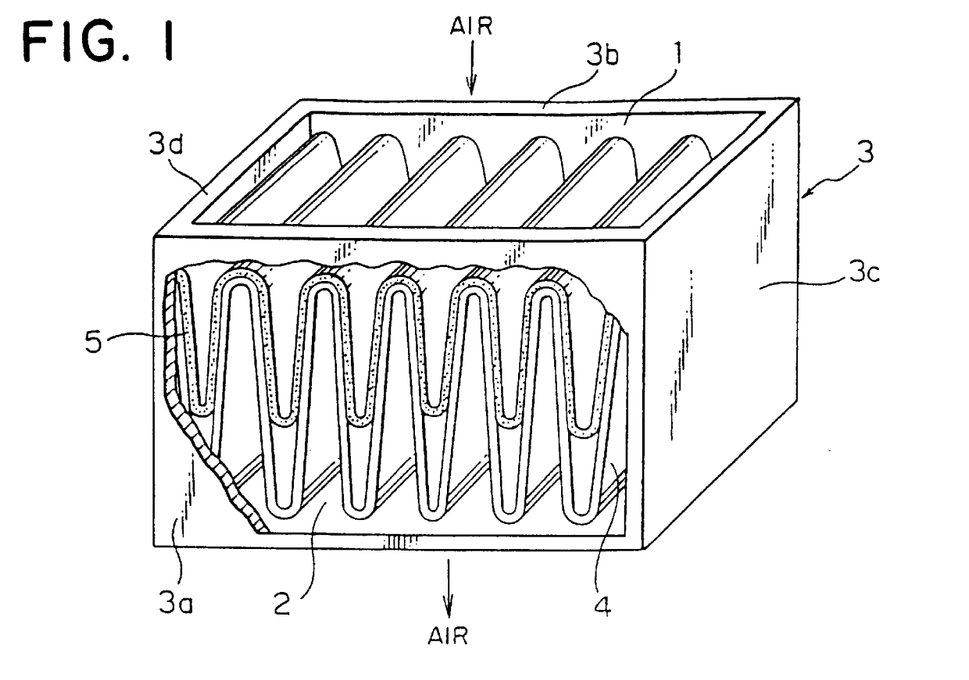
FIG. 1 is a perspective view of an embodiment of the present multifunctional air filter module, with part of a front wall thereof shown broken away.

In FIG. 1, the present multifunctional air filter module comprises a filter case 3 having an air introduction side (windward side) opening 1 and an air discharge side (leeward side) opening 2, and a pleated air filter element 4 (fixed filter element) and a filter element fabric 5 (replaceable filter element) woven of chemical substance absorptive fibers that are contained in the filter case. The filter case 3 is composed of a front wall 3a, a rear wall 3b, and two side walls 3c and 3d. The case is shown with part of the front wall 3a broken away for convenience of description.

The pleated filter element 4 is fixed to the surrounding walls 3a, 3b, 3c, and 3d with no clearance between the pleated filter element 4 and the walls. As the element 4, a DPCC that is made of a polyester fiber sheet containing activated carbon fine particles made into relatively rigid pleats, is most preferable.

Figure 2:
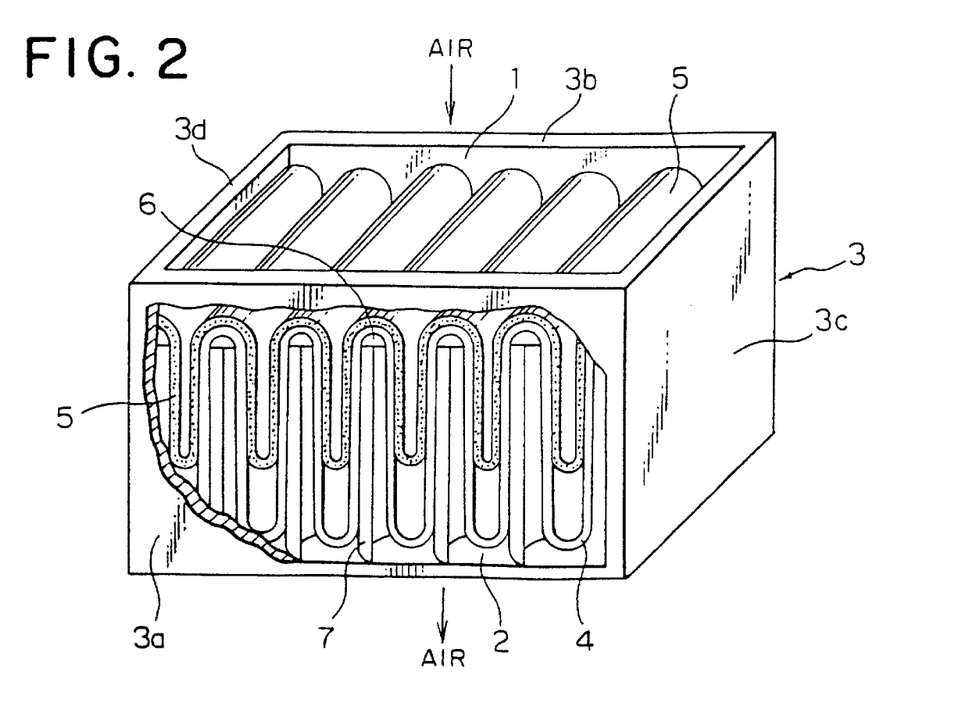
FIG. 2 is a perspective view of another embodiment of the present multifunctional air filter module, with part of a front wall thereof shown broken away.

FIG. 2 shows another embodiment of the present multifunctional air filter module, in which the members corresponding to the members in FIG. 1 are indicated by the same reference numerals. In the embodiment of FIG. 2, a flexible felt-like fiber element 4 is used. In this case, to keep the shape of pleats, the element 4 is supported by supports 7 having roof sections 6 with the ridges of the pleats supported. Preferably the support 7 is made of a wave shaped nonmetal material, such as a wave shaped plastic.

In FIGS. 1 and 2, the filter element fabric 5 woven of chemical substance absorptive fibers is used in the form of a sheet and is laid in the grooves on the windward side of the pleated air filter element 4. Thus, when the fabric 5 is deteriorated, it can be replaced easily. The filter element fabric 5 may be put into the half of the grooves formed by the filter element 4 as shown in FIGS. 1 and 2. Alternatively, it may be put into the bottom of the grooves. Indeed, small cut pieces, having an area smaller than the area of the opening 1 of the case 3 (for example, cut pieces having a width of about 0.5 to 5 cm and a length of about 5 to a maximum of the width of the case, typically a length of about 5 to about 50 cm) are embedded in said grooves, of the filter element fabric 5 may be embedded in the above grooves. If it is expected to prolong the life of the present multifunctional air filter, it is recommended to embed such small cut pieces.

As the element fabric 5, any commercially available element fabrics can be used. The following materials can be used.

(i) Fabrics containing an activated carbon having a strong base such as KoH, tetraalkyl ammonium hydroxide (e.g., tetramethyl ammonium hydroxide) or $KMnO_4$ attached thereto. The fabrics of this type are effective in removing acidic gases, such as HCl, HF, $H_2SO_4$ and the like. Further, the fabrics are also effective in removing organic substances and $O_3$. The removal of such chemical contaminants result in formation of water soluble salts, which can be readily removed from the replaceable filter element by dipping in hot water, for instance. The replaceable filter element thus treated can be regenerated and is reusable by re-attachment of a strong base or $KMnO_4$.

(ii) Fabrics containing an activated carbon having $ZnCl_2$ attached thereto. The fabrics of this type are effective in removing alkaline gases such as $NH_3$, and amines. The removal of alkaline gases results in formation of chloride salts, which are water-soluble and can be readily removed from the filter element by dipping it in hot water, for instance. The filter element thus treated can be regenerated by re-attachment of $ZnCl_2$.

(iii) Cation exchange fiber fabrics. These are effective in removing alkaline gases such as $NH_3$ and amines.

(iv) Anion exchange fiber fabrics. These are effective in removing acidic gases such as HCl, HF, $H_2SO_4$, etc. The ion exchange fiber fabrics can be readily regenerated in a conventionally known manner. Anion exchange fiber fabrics which have absorbed acidic components can be regenerated by treatment with e.g., NaOH or the like, followed by washing with water and drying. Cation exchange fiber fabrics having absorbed alkaline gases can be regenerated by use of HCl, $H_2SO_4$, or the like.

More specifically, an activated carbon-fiber woven fabric to which a strong base, $KMnO_4$, or $ZnCl_2$ is attached, a cation exchange fiber woven fabric, and an anion exchange fiber woven fabric, can be used. These fabrics can be used singly or as a combination of two or more in accordance with the intended function of removing chemical contaminants.

The felt-like anion exchange resin fiber woven fabric or the like is effective for removing acid gases.

Generally, filters have a pressure loss and if there are any leaks the removing performance will drop substantially. The pleated element 4 that is the foundation of the construction of the filter is bonded and fixed to the walls 3a, 3b, 3c, and 3d of the case without any clearance between the pleated element 4 and the walls 3a, 3b, 3c, and 3d, thereby not to allow any leak therebetween. For example, in the case of a DPCC filter the pressure loss is 2.0 $mmH_2O$ at an average wind velocity of 0.5 m/sec. If the thickness of the felt-like activated carbon-fiber woven fabric or the ion exchange resin fiber woven fabric that is laid in the grooves is 2 mm or less, the pressure loss is generally much lower than this value. Accordingly, the element fabric 5 laid as shown in FIG. 1 is apparently in a leaky state along its periphery because the periphery is not fixed to the walls. However, the amount of air that does not pass through the element fabric 5 but passes at the periphery is very small and most of the air passes through the fibers of the element fabric 5. Therefore, while the air is treated circularly, the fibers of the element fabric 5 act sufficiently on chemical contaminants in the air to remove the chemical contaminants. The same is said of the case where small cut pieces of the filter element fabric are embedded in the grooves of the pleats.

In the present multifunctional air filter module, where the fabric of the pleated filter element 4 fixed to the case 3 is increased in thickness, the pressure loss is increased drastically and therefore the replaceable element fabric in the grooves of filter element 4 increasingly comes in contact with and acts on the air passed through it.

Chemical contaminants that are to be removed by the present multifunctional air filter module, that is, chemical contaminants in the air harmful to the semiconductor process are inorganic molecules, for example, of acid gases, such as HF, HCl, and $H_2SO_4$, alkaline gases, such as $NH_3$ and amines, $NO_2$ and $SO_2$ which are major air pollutants, or $O_3$, and organic molecules which are liable to be adsorbed onto a bare silicon surface. To remove these, at least two types of chemical filter elements are required. According to the present invention, this requirement is met by the combination of the fixed filter element and at least one replaceable filter element.

Even if the removing performance of these chemical filter elements themselves is lowered to about 70%, if they are, for example, used in an air-circulating clean unit, the cumulative effect of reducing contaminants works to attain a very low level of chemical contaminant concentration required by in-unit processing apparatuses.

The air-circulating clean unit

Figure 3:
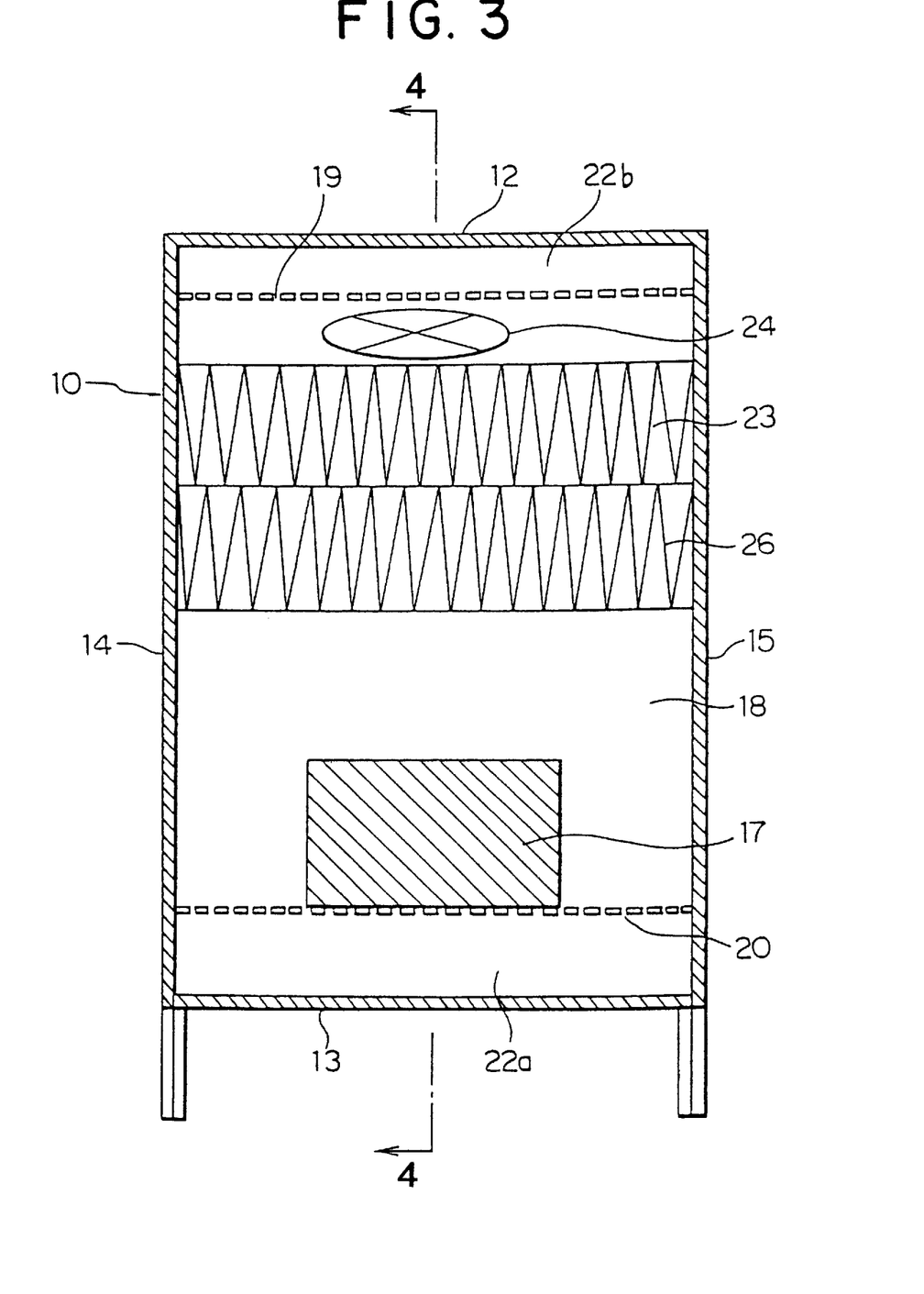
FIG. 3 is a front vertical sectional view, showing schematically the structure of an air-circulating clean unit that uses the above multifunctional air filter module.
Figure 4:
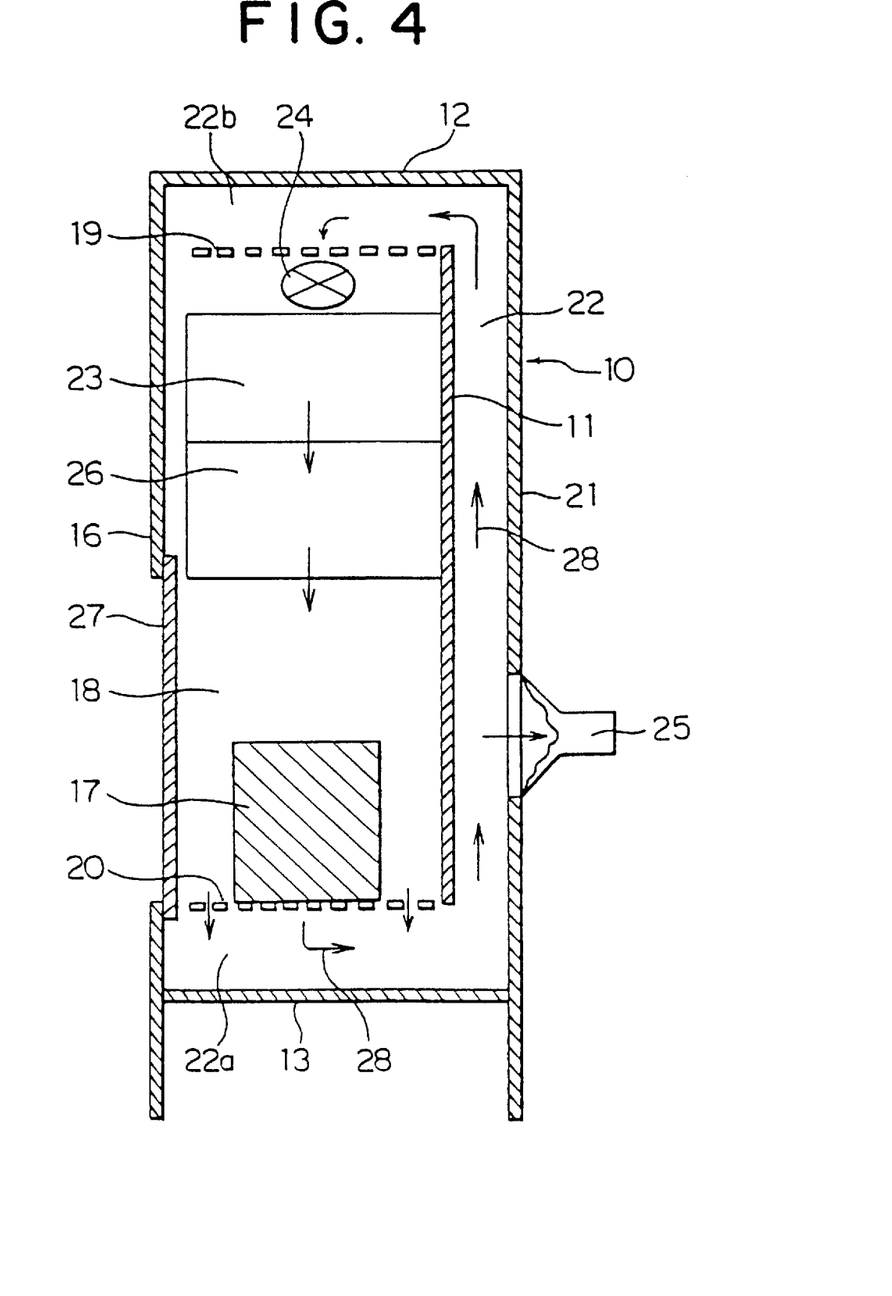
FIG. 4 is a side vertical sectional view taken along line 4–9 of the clean unit of FIG. 3.
Figure 5:
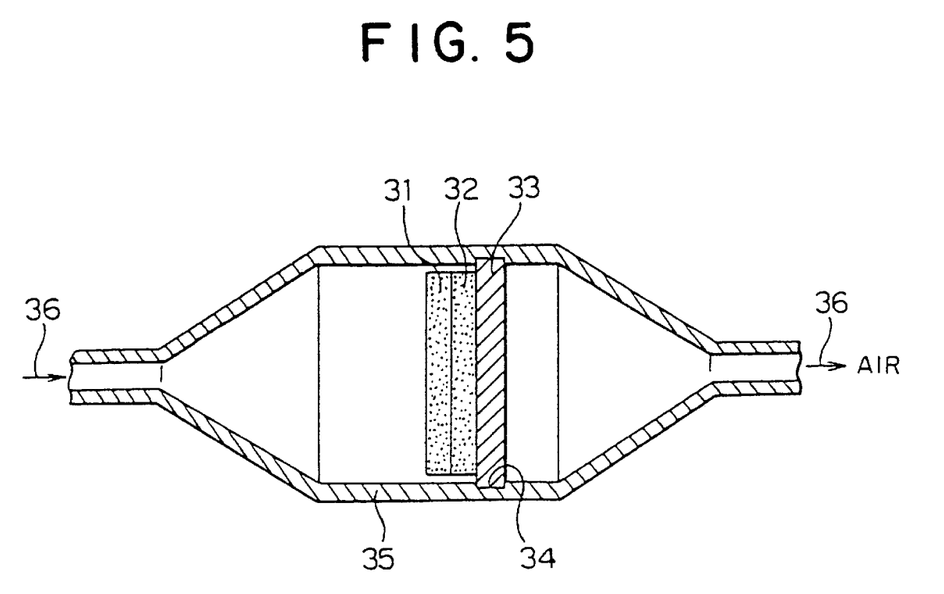
FIG. 5 is a vertical sectional view of a tube in which three filter elements are provided, for simulating the air filter module of the present invention.

FIGS. 3 and 4 show the present air-circulating clean unit, the clean unit having a partition wall 11 formed vertically in a box 10. The wall 11 partitions the interior of the box 10 into a chamber 18 and an air flow passage 22, and does not reach a top wall 12 or a bottom wall 13 of the box 10 to thereby enable air to pass below and above the partition wall 11. However, the partition wall 11 is closely fixed over the length of two side walls 14 and 15. The partition wall 11, a front wall 16 of the box 10 and the two side walls 14 and 15 form the chamber 18 for accommodating a processing apparatus 17. A part of the front wall 16 constitutes a door 27 which can be closed or opened. In the upper part of the box 10, a partition 19 through which air can freely pass, of e.g. grate or lattice, is provided. At the lower end (air outlet) of the chamber 18, a partition 20 through which air can pass freely is provided and processing apparatus 17 is placed on partition 20. The partition wall 11, a rear wall 21 of the box 10 and the two side walls 14 and 15 form the air recirculating passage (duct) 22. A space 22a between the air-through partition 20 and the bottom 13, and a space 22b between the air-through partition 19 and the top wall 12 each are in communication with and constitute a part of the air-recirculating passage 22. In the upper portion of box 10, below partition 19, is installed an air filter module 23 in the form of multifunctional air filter module of the invention. A HEPA filter module 26 is situated as a filter module for removing fine particles such as dust particles on the leeward side of the multifunctional air filter module 23. A filter module for removing fine particles is essential downstream of the multifunctional filter module of the invention and upstream of the chamber because it is inevitable for the multifunctional filter module to generate dust particles. As the filter module for removing dust particles, any other known filter modules, e.g. ULPA filter module, can be used. Air which has passed through air filter modules 23 and 26 and been discharged through the air-through partition 20 from the chamber 18 into the space 22a, passes through the duct 22, the space 22b and the air-through partition 19 and is recirculated into the air filter modules 23 and 26. In FIG. 4, the arrows 28 show the flow of the air.

The above processing apparatus accommodating chamber 18 is isolated by the walls of the box 10 from the outer environment and accommodates the processing apparatus 17. In the upper part in the box, immediately downstream of the partition 19 is incorporated a blower 24 for circulating the air in the unit. The blower may be installed in the duct 22. Further, for the purpose, for example, of cleaning, maintenance, or emergency quick evacuation of the processing apparatus 17 placed in the unit, the unit is generally provided with an evacuation port 25 having a shutter. Such an evacuation port may be provided on either of the side wall 14 or 15.

Thus, air is passed by blower 24 through the filter module 23 in which chemical contaminants have been decreased, is dedusted by the HEPA filter module 26., is passed through the chamber 18 accommodating the processing apparatus 17, is discharged through the air-through grate 20, passes through the duct 22, and is returned to the filter module 23. This flow of the air is repeated.

To obtain an ultraclean environment, a structure wherein one multifunctional air filter module 23 and one HEPA filter module 26 are arranged, preferably in series, is adopted. However, the multifunctional filter module of the invention may be located at any position in the course of the air passage downstream of the outlet of the chamber and upstream of the filter module for dust removal. The filter module for dust particle removal must be located downstream of the multifunctional filter module and upstream of the inlet of the chamber.

In the present invention, if the element fabric 5 is laid as shown in FIG. 1, there are leaks at the periphery thereof, and part of the air passes through the filter module without passing through the element fabric 5. Accordingly, if the air is passed through the present multifunctional air filter only once, the performance of removing contaminants is not satisfactory. However, by incorporating this multifunctional air filter module in the air-circulating clean unit of the present invention, the processing apparatus accommodating chamber therein can acquire positively an ultraclean environment. For example, if the unit is operated at a wind velocity of about 0.5 m/sec that is required generally by the processing apparatus, the ventilation frequency becomes 10 or more per sec. Since the same air is passed through the filter module 23 at such a high frequency, even though the removing performance of the filter itself is low when the air is passed through it once, the amount of the contaminants in the particular air is decreased progressively. Therefore, after a short period of time after the start of the operation of the unit, cleanliness is improved.

EXAMPLES

Example 1

Figure 6:
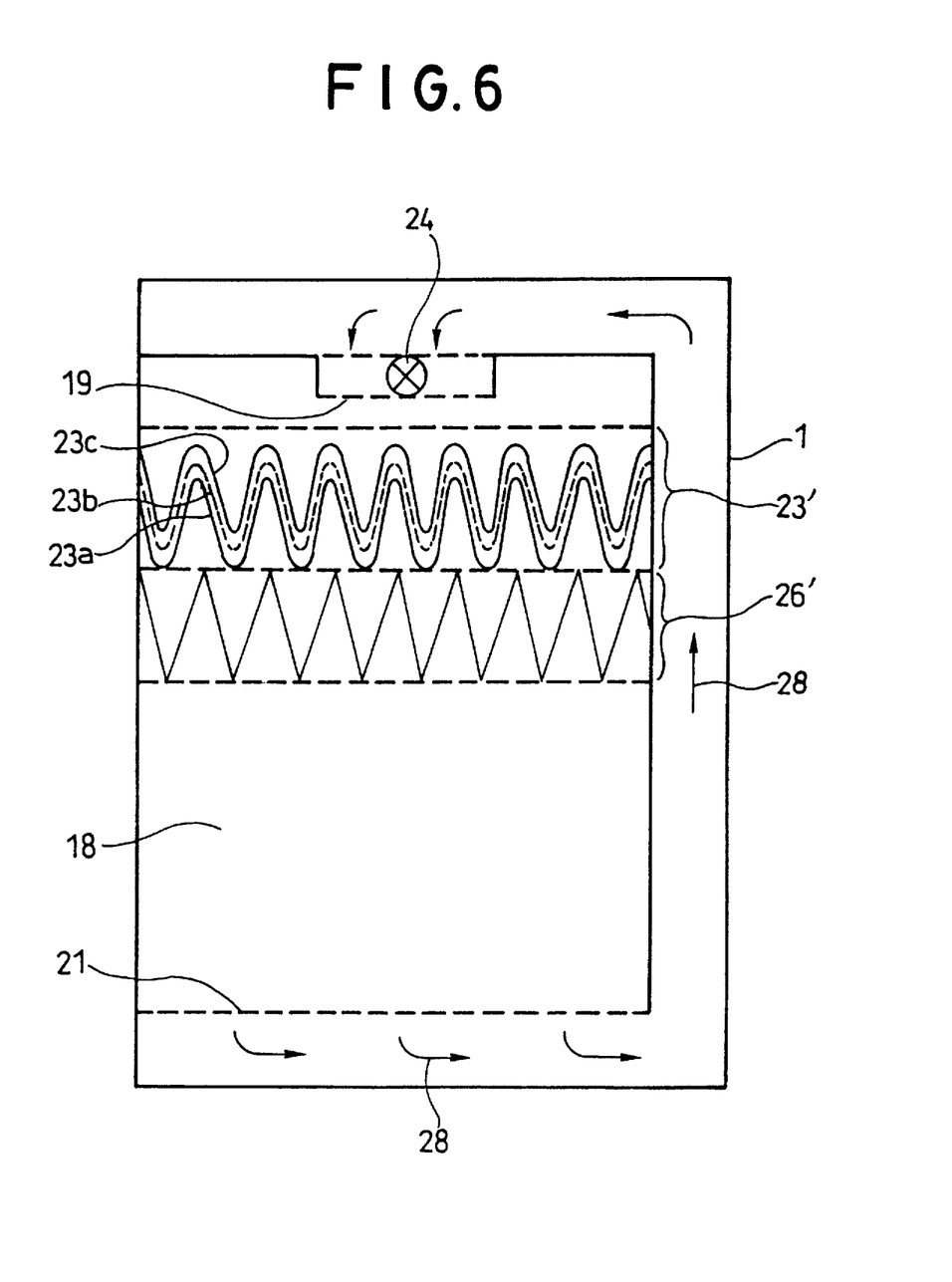
FIG. 6 is an illustration, showing schematically the structure of a clean unit having a chemical filer module in which a fixed pleated filter element and two layers of filter elements are installed, and an ULPA filter module.

A clean unit as shown in FIG. 6 was installed in a semiconductor clean room in which dust level and contaminants were measured to be as follows.

Dust level: Class 10 according to ASTM standard.

F: 1.5 ppb

Cl: 3.2 ppb $NO_2$: 2.3 ppb $NO_3$: 0.5 ppb $PO_4$: 0.4 ppb $SO_4$: 12 ppb $NH_3$: 35 ppb In FIG. 6, the same elements as in FIGS. 3 and 4 are indicated by the same numerals. In the clean unit, an ULPA filter module 26' for removing fine particles is installed immediately upstream of a chamber 18, and a multifunctional filter module 23' for removing chemical contaminants according to the present invention is detachably installed immediately upstream of the ULPA filter module 26' in series. The chemical filter module 23' was prepared by modifying a filter module available under the tradename DPCC 1076 stated above in which a pleated polyester fabric containing an activated carbon fine particles with no other chemical absorptive agent 23a is provided and fixed to a case of the module at its periphery. In the grooves formed by the fabric 23a, an anion exchange fiber fabric 23b was simply placed, and furthermore in the grooves formed by the fabric 23b an activated carbon fiber fabric 23c having $ZnCl_2$ attached thereto was simply placed.

In the chamber 18 of the clean unit thus assembled, a silicon wafer whose surface had been previously made hydrophilic (water droplet contact angle: 2.3–2.7°) by SC-1 treatment was placed. After the clean unit was closed, air which contained initially the same amounts of dust particles and contaminants as stated above, was circulated at a rate of 0.5 m/sec. After the circulation of air for 30 minutes, amounts of duct particles and chemical contaminants in the air sampled at the chamber 18 were measured, and water droplet contact angle on the silicon wafer was measured. As a result, it was found that the dust level was below class 1 according to ASTM, and that the contents of any of F, Cl, $NO_2$, $NO_3$, $PO_4$, $SO_4$ and $NH_3$ were below 50 ppt. That is, only 30 minutes after initiation of the circulation, an ultraclean environment was obtained.

Further, the circulation of air was continued for 96 hours, followed by similar measurement. It was found that the amounts of the contaminants were below 50 ppt, and that the water droplet contact angle remained unchanged within 2.3–2.7°, which means that the content of organic contaminants in the air is negligibly low, because attachment of organic contaminants on the silicon wafer would have reduced the hydrophilic nature of the wafer surface and increased water droplet contact. It is to be noted that if a silicone wafer having the same hydrophilic surface as mentioned above is placed in a conventional clean room for several hours, the water droplet contact angle will increase up to at least 10–15° due to attachment on the wafer surface of organic contaminants such as e.g. DOP and siloxanes generated from materials used for the clean room. This fact being taken into account, the level of cleanness created in the clean unit is sufficiently high to meet requirements of semiconductor industries.

What is claimed is:

1. A multifunctional air filter module with at least one replaceable and reusable fabric filter element for reducing both organic and inorganic contaminants, said module comprising:

a filter case having an air introduction side opening and an air discharge side opening;

a pleated fabric filter element selected from the group consisting of an activated carbon fiber having no further chemical contaminant absorptive substance attached thereto, a combination of said activated carbon fiber and a reinforcing fiber, and a combination of a fabric and activated carbon particles contained therein, positioned in said filter case in such a way that said pleated fabric filter element extends across an air flow directed from said air introduction side opening to said air discharge side opening, said pleated fabric filter element having a periphery that is fixed to said case without a clearance therebetween; and at least one replaceable fabric filter element formed of a fabric selected from the group consisting of a fabric containing an activated carbon having a strong base attached thereto, a fabric containing an activated carbon having $KMnO_4$ attached thereto, a fabric containing an activated carbon having $ZnCl_2$ attached thereto, a cation exchange fiber fabric, and an anion exchange fiber fabric, said replaceable fabric filter element being simply placed in air introduction side grooves formed by said pleated fabric filter element and having a periphery not attached to said case.

2. A multifunctional air filter module as claimed in claim 1 wherein said pleated fabric filter element is selected from the group consisting of a woven or unwoven fabric of an activated carbon fiber having no further chemical contaminant absorptive substance attached thereto, a woven or unwoven fabric formed of an activated carbon fiber having no further chemical contaminant absorptive substance attached thereto and a reinforcing fiber, and a woven or unwoven fabric containing activated carbon particles having no further chemical contaminant absorptive substance attached thereto.

3. A multifunctional air filter module as claimed in claim 1, wherein said pleated fabric filter element essentially consists of a rigid polyester fiber sheet containing activated carbon fine particles or a flexible unwoven fiber sheet containing activated carbon fine particles.

4. A multifunctional air filter module as claimed in claim 1, wherein said replaceable fabric filter element not fixed to said filter case is a woven fabric.

5. A multifunctional air filter module as claimed in claim 1, wherein said replaceable fabric filter element is selected from the group consisting of a fabric containing an activated carbon having KOH attached thereto, a fabric containing an activated carbon having $KMnO_4$ attached thereto, and a fabric containing an activated carbon having $ZnCl_2$ attached thereto.

6. A multifunctional air filter module as claimed in claim 1, wherein said replaceable fabric filter element is selected from the group consisting of a cation exchange fiber fabric, and an anion exchange fiber fabric.

7. A multifunctional air filter module as claimed in claim 1, wherein said pleated fabric filter element essentially consists of a rigid polyester fiber sheet containing activated carbon fine particles or a flexible unwoven fiber sheet containing activated carbon fine particles, and said replaceable fabric filter element not fixed to said filter case is selected from the group consisting of an activated carbon fiber woven fabric to which a strong base, $KMnO_4$ or $ZnCl_2$ is attached.

8. A multifunctional air filter module as claimed in claim 1, wherein a plurality of supports having roof sections for keeping the shape of said pleated fabric filter element are provided in said filter case.

9. A multifunctional air filter module as claimed in claim 1, wherein said replaceable fabric filter element placed in said grooves comprises a single bent sheet.

10. A multifunctional air filter module as claimed in claim 1, wherein said replaceable fabric filter element placed in said grooves is in the form of small pieces with a width of about 0.5 to 5 cm and a length of about 5 to about 50 cm, and said pieces are embedded in said grooves.

11. An air-circulating clean unit comprising a box isolating the inside thereof from the outer environment, a chamber formed in said box for accommodating a processing apparatus and having an air inlet and an air outlet, an air passage for recirculating air discharged from said air outlet into said air inlet, and one or more air filter modules arranged across said air passage prior to said chamber, wherein said air filter modules each comprise a multifunctional air filter module as claimed in claim 1.

* * * * *